United States Patent
Szurley et al.

(10) Patent No.: US 11,526,747 B2
(45) Date of Patent: Dec. 13, 2022

(54) TRAINING A DEEP LEARNING SYSTEM TO DETECT ENGINE KNOCK WITH ACCURACY ASSOCIATED WITH HIGH FIDELITY KNOCK DETECTION SENSORS DESPITE USING DATA FROM A LOW FIDELITY KNOCK DETECTION SENSOR

(71) Applicant: Robert Bosch GmbH, Stuttgart (DE)

(72) Inventors: Joseph Christopher Szurley, Upper St. Clair, PA (US); Samarjit Das, Sewickley, PA (US)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 16/236,085

(22) Filed: Dec. 28, 2018

(65) Prior Publication Data
US 2020/0210825 A1    Jul. 2, 2020

(51) Int. Cl.
G06N 3/08    (2006.01)
G06N 20/00    (2019.01)
F02P 5/152    (2006.01)

(52) U.S. Cl.
CPC .............. *G06N 3/08* (2013.01); *G06N 20/00* (2019.01)

(58) Field of Classification Search
CPC ................................. G06N 3/08; G06N 20/00
See application file for complete search history.

(56) References Cited

U.S. PATENT DOCUMENTS

| 5,269,178 A | 12/1993 | Vigmostad et al. |
| 6,246,953 B1 * | 6/2001 | Quinn ................... F02P 5/1525 701/111 |
| 7,222,607 B2 | 5/2007 | Hernandez |
| 7,454,954 B2 | 11/2008 | Taglialatela et al. |

(Continued)

FOREIGN PATENT DOCUMENTS

JP    2005120896 A  *  5/2005    ........... F02D 35/024

OTHER PUBLICATIONS

Zhu et al. "Closed-loop ignition timing control for SI engines using ionization current feedback." IEEE transactions on control systems technology 15.3 (2007): 416-427. (Year: 2007).*

(Continued)

*Primary Examiner* — Abdullah Al Kawsar
*Assistant Examiner* — Asher H. Jablon
(74) *Attorney, Agent, or Firm* — Michael Best & Friedrich LLP

(57) ABSTRACT

A system for training a deep learning system to detect engine knock with accuracy associated with high fidelity knock detection sensors despite using data from a low fidelity knock detection sensor. The system includes an engine, a high fidelity knock detection sensor, a low fidelity knock detection sensor, and an electronic processor. The electronic processor is configured to receive first data from the high fidelity knock detection sensor. The electronic processor is also configured to receive second data from the low fidelity knock detection sensor. The electronic processor is further configured to map the first data to the second data, train the (Continued)

deep learning system, using training data including the mapped data, to determine a predicted peak pressure using data from the low fidelity knock detection sensor, receive third data from the low fidelity knock detection sensor, and using the third data, determine the predicted peak pressure.

12 Claims, 8 Drawing Sheets

(56) References Cited

U.S. PATENT DOCUMENTS

| | | | |
|---|---|---|---|
| 7,614,289 B2 | 11/2009 | Miyaji et al. | |
| 9,869,257 B2* | 1/2018 | Batal | F02D 35/027 |
| 2006/0185422 A1* | 8/2006 | Iwade | G01L 23/225 |
| | | | 73/35.09 |
| 2016/0245209 A1 | 8/2016 | Bizub et al. | |
| 2017/0051699 A1* | 2/2017 | Batal | F02D 35/024 |

OTHER PUBLICATIONS

Brecq et al. "A new indicator for knock detection in gas SI engines." International Journal of Thermal Sciences 42.5 (2003): 523-532. (Year: 2003).*

Bizon et al. "Reconstruction of in-cylinder pressure in a diesel engine from vibration signal using a RBF neural network model." No. 2011-24-0161. SAE Technical Paper, 2011. (Year: 2011).*

Wang et al. "Knocking combustion in spark-ignition engines." 2017. Progress in Energy and Combustion Science 61 (2017): 78-112. (Year: 2017).*

Gunnemann et al. "Predicting Defective Engines using Convolutional Neural Networks on Temporal Vibration Signals." 2017. First International Workshop on Learning with Imbalanced Domains: Theory and Applications, pp. 92-102. (Year: 2017).*

Panzani et al. "Engine Knock Margin Estimation Using In-Cylinder Pressure Measurements," in IEEE/ASME Transactions on Mechatronics, vol. 22, No. 1, pp. 301-311, Feb. 2017 (Year: 2017).*

* cited by examiner

HIGH FIDELITY KNOCK DETECTION SENSOR

LOW FIDELITY KNOCK DETECTION SENSOR

TRAINING A DEEP LEARNING SYSTEM TO DETECT ENGINE KNOCK WITH ACCURACY ASSOCIATED WITH HIGH FIDELITY KNOCK DETECTION SENSORS DESPITE USING DATA FROM A LOW FIDELITY KNOCK DETECTION SENSOR

SUMMARY

Engine knock occurs when there is incomplete or non-uniform ignition of fuel within a combustion chamber of an engine. The engine may be included in, for example, a passenger vehicle. When engine knock occurs, it may cause audible noise that is discomforting to passengers of the vehicle. Engine knock may also cause damage to the engine. High fidelity knock detection sensors can withstand high temperatures and pressures present in the combustion chamber but these high fidelity sensors are expensive and installation of the high fidelity sensors is expensive and time consuming. The expensive installation costs of the sensors is in part due to the fact that professional installation is needed to access the internal portion of the combustion chamber where high fidelity sensors should be located. There are less expensive low fidelity knock detection sensors that rely on vibration of the engine block of the engine. These low fidelity sensors sacrifice fidelity but are less expensive because they are easier to install than the high fidelity sensors and do not have to withstand high pressures and temperatures. An example of a high fidelity knock detection sensor 100 is illustrated in FIG. 1A. As shown in FIG. 1A, a high fidelity knock detection sensor 100 is included in a combustion chamber 105 of an engine 110. An example of a low fidelity knock detection sensor 115 is illustrated in FIG. 1A. As shown in FIG. 1B, a low fidelity knock detection sensor 115 is installed on an engine block 120 of the engine 110.

It would be beneficial if the fidelity achieved with high fidelity sensors could be achieved without incurring the expense of acquiring and installing such sensors. Embodiments described herein provide, among other things, a system and a method for training a deep learning system to detect engine knock with accuracy associated with high fidelity sensors despite using data from a low fidelity sensor.

One embodiment provides a system for training a deep learning system to detect engine knock with accuracy associated with high fidelity knock detection sensors despite using data from a low fidelity knock detection sensor. The system includes an engine, a high fidelity knock detection sensor, a low fidelity knock detection sensor, and an electronic processor. The electronic processor is configured to receive first data from the high fidelity knock detection sensor. The first data represents pressure in a combustion chamber of the engine. The electronic processor is also configured to receive second data from the low fidelity knock detection sensor. The second data represents vibrations of an engine block. The electronic processor is further configured to map the first data to the second data and using training data including the mapped data, train the deep learning system to determine a predicted peak pressure using data from the low fidelity knock detection sensor. The electronic processor is also configured to receive third data from the low fidelity knock detection sensor and using the third data, determine the predicted peak pressure with the trained deep learning system.

Another embodiment provides a method for training a deep learning system to detect engine knock with accuracy associated with high fidelity knock detection sensors despite using data from a low fidelity knock detection sensor. The method includes receiving, with an electronic processor, first data from a high fidelity knock detection sensor. The first data represents pressure in a combustion chamber of an engine. The method also includes receiving, with the electronic processor, second data from a low fidelity knock detection sensor. The second data represents vibrations of an engine block. The method further includes mapping, with the electronic processor, the first data to the second data and using training data including the mapped data, training the deep learning system to determine a predicted peak pressure using data from the low fidelity knock detection sensor. The method also includes receiving third data from the low fidelity knock detection sensor and using the third data, determining the predicted peak pressure with the trained deep learning system.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1A:
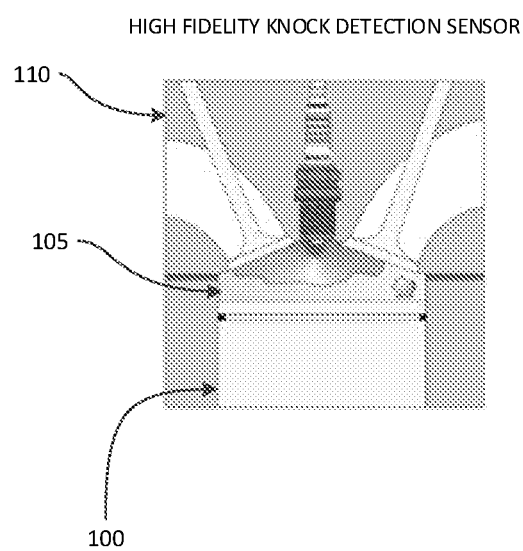
FIG. 1A is an illustration of an installed high fidelity knock detection sensor according to one embodiment.
Figure 1B:
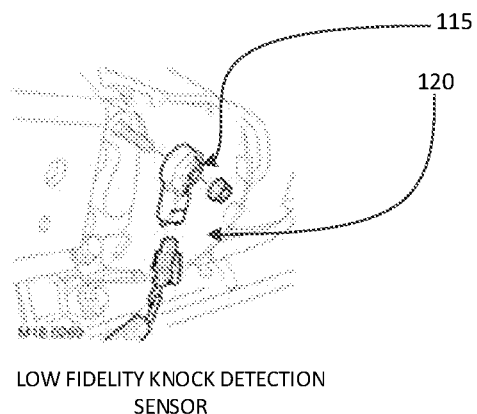
FIG. 1B is an illustration of an installed low fidelity knock detection sensor according to one embodiment.
Figure 2:
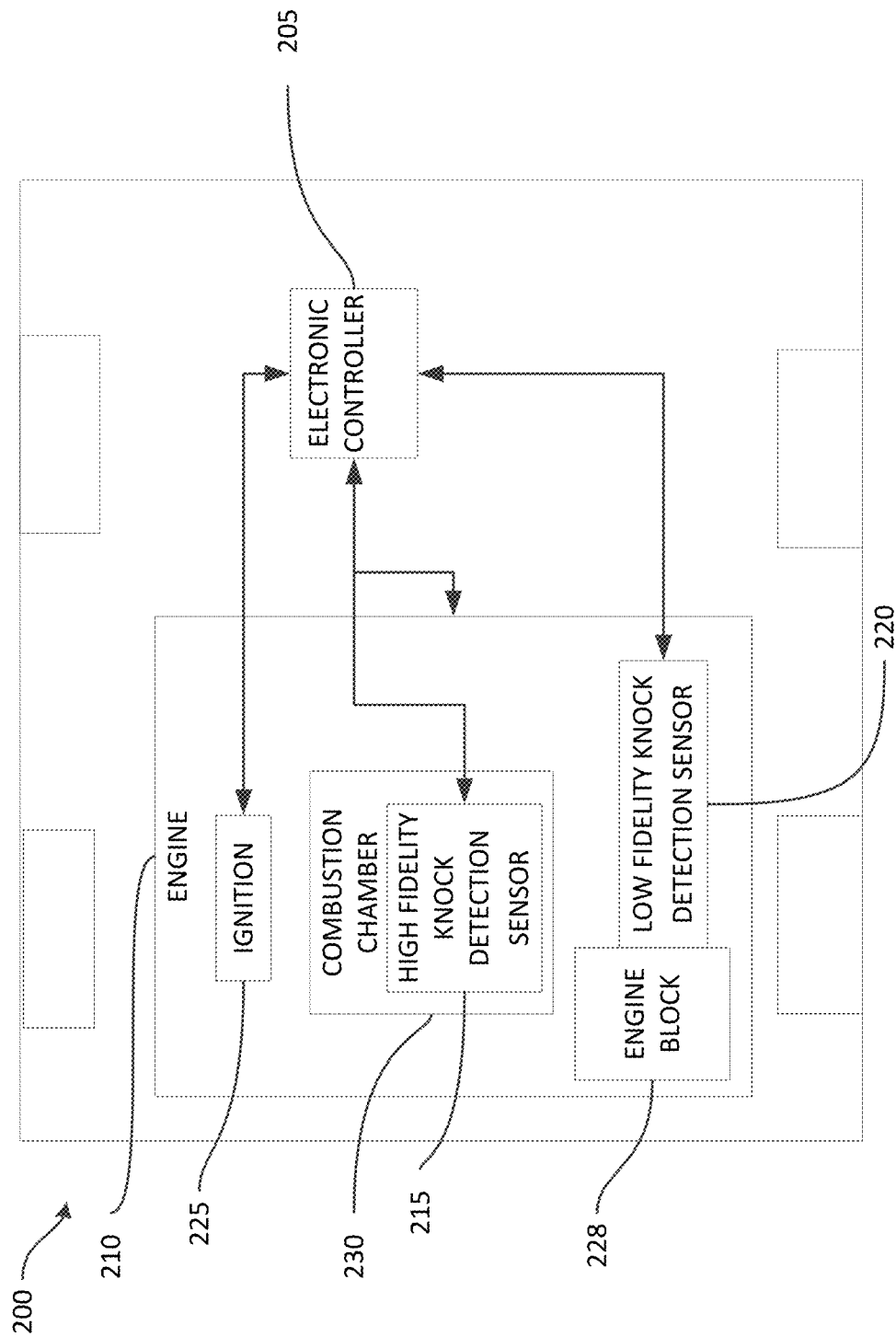
FIG. 2 is a block diagram of a system for training a deep learning system to detect engine knock with accuracy associated with high fidelity sensors despite using data from a low fidelity sensor according to some embodiments.

FIG. 2 illustrates a system 200 for training a deep learning system to detect engine knock with accuracy associated with high fidelity sensors despite using data from a low fidelity sensor. The system 200 includes, among other things, an electronic controller 205, an engine 210, a high fidelity knock detection sensor 215, and a low fidelity knock detection sensor 220. The engine 210 may include an ignition 225, an engine block 228, and a combustion chamber 230. The high fidelity knock detection sensor 215 may be placed within a combustion chamber 230 of the engine 210 and configured to measure the pressure of gasses in the combustion chamber 230. The low fidelity knock detection sensor 220 may be mounted on the exterior of the engine 210 (for example, on the engine block 228 of the engine 210) and configured to measure vibrations of the engine 210.

The embodiment illustrated in FIG. 2 provides but one example of the components and connections of the system 200. However, these components and connections may be constructed in other ways than those illustrated and described herein. It should be noted that while the system 200 is illustrated as being included in a four wheeled vehicle the system 200 may be included in various types and designs of vehicles. For example, the system 200 may be included in an automobile, a motorcycle, a truck, a bus, a semi-tractor, and others. Additionally, the system 200 may be included in a machine powered by a combustion engine other than a vehicle.

The electronic controller 205 may be communicatively connected to the engine 210, high fidelity knock detection sensor 215, low fidelity knock detection sensor 220, and ignition 225 via various wired or wireless connections. For example, in some embodiments, the electronic controller 205 is directly coupled via a dedicated wire to each of the above-listed components of the system 200. In other embodiments, the electronic controller 205 is communicatively coupled to one or more of the components via a shared communication link such as a vehicle communication bus (for example, a controller area network (CAN) bus) or a wireless connection. Additionally, each of the components of the system 200 may communicate with the electronic controller 205 using various communication protocols.

Figure 3:
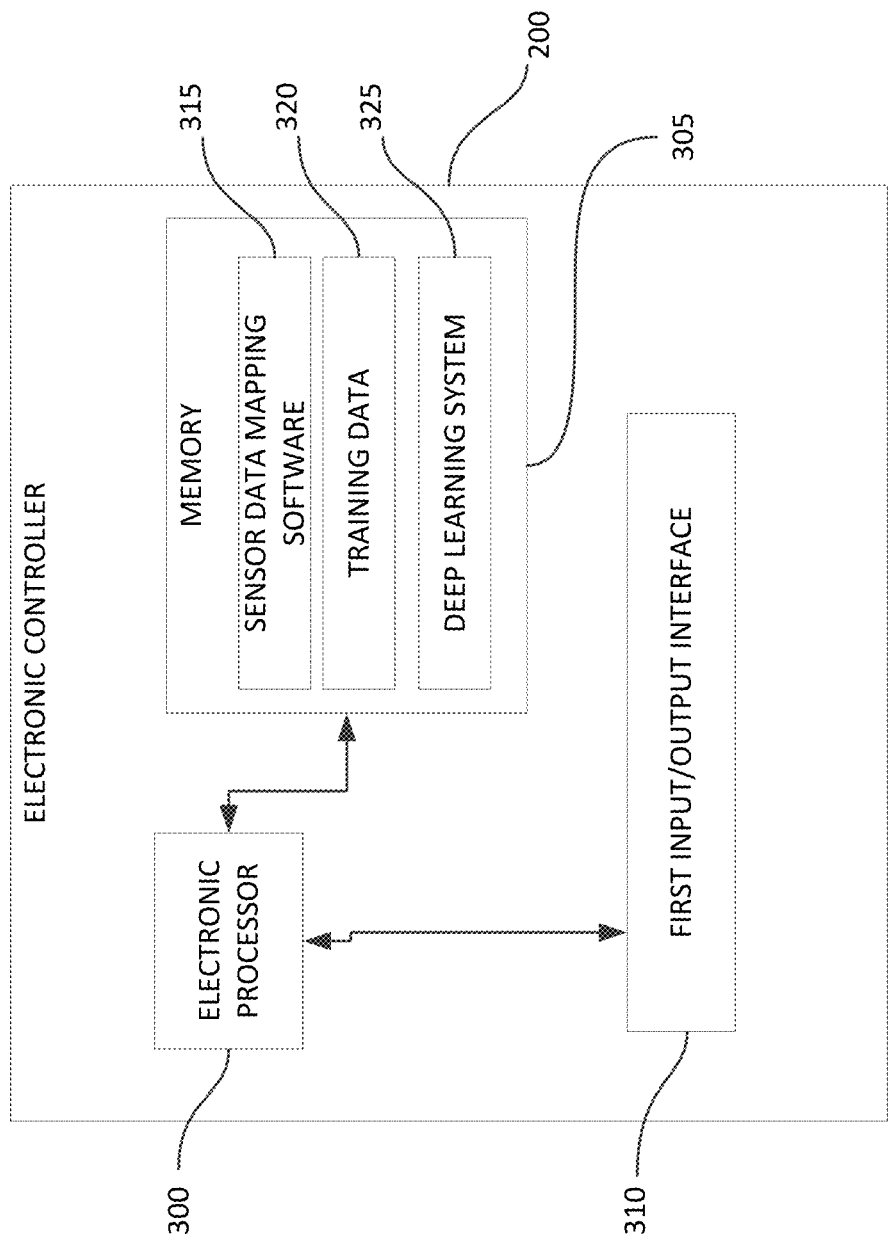
FIG. 3 is a block diagram of an electronic controller of the system of FIG. 2.

FIG. 3 is a block diagram of the electronic controller 205 of the system 200. The electronic controller 205 includes a plurality of electrical and electronic components that provide power, operation control, and protection to the components and modules within the electronic controller 205. The electronic controller 205 includes, among other things, an electronic processor 300 (such as a programmable electronic microprocessor, microcontroller, or similar device), a memory 305 (for example, non-transitory, computer readable memory), and an input/output interface 310. The electronic processor 300 is communicatively connected to the memory 305 and the input/output interface 310. The electronic processor 300, in coordination with the memory 305 and the input/output interface 310, is configured to implement, among other things, the methods described herein.

As will be described in further detail below, the memory 305 includes computer executable instructions for training a deep learning system to detect engine knock with accuracy associated with high fidelity knock detection sensors despite using data from a low fidelity knock detection sensor. In the example illustrated in FIG. 3, the memory 305 includes sensor data mapping software 315, training data 320, and a deep learning system 325. In some embodiments, the sensor data mapping software 315 maps data received from the high fidelity knock detection sensor 215 to data received from the low fidelity knock detection sensor 220 to create the training data 320 which is used by the electronic processor 300 to train the deep learning system 325 to detect engine knock (more specifically to determine a peak pressure in the combustion chamber 230 of the engine 210). It should be understood that the memory 305 may include more, fewer, or different programs than those illustrated in FIG. 3. It should also be understood that functionality or values described herein as being associated with one component of the memory 305 may, in other embodiments, be associated with a different component of the memory 305.

In some embodiments, the electronic controller 205 may be implemented in several independent controllers (for example, programmable electronic controllers) each configured to perform specific functions or sub-functions. Additionally, the electronic controller 205 may contain sub-modules that include additional electronic processors, memory, or application specific integrated circuits (ASICs) for handling input/output functions, processing of signals, and application of the methods listed below. In other embodiments, the electronic controller 205 includes additional, fewer, or different components. Thus, the programs may also be distributed among one or more processors.

Figure 4:
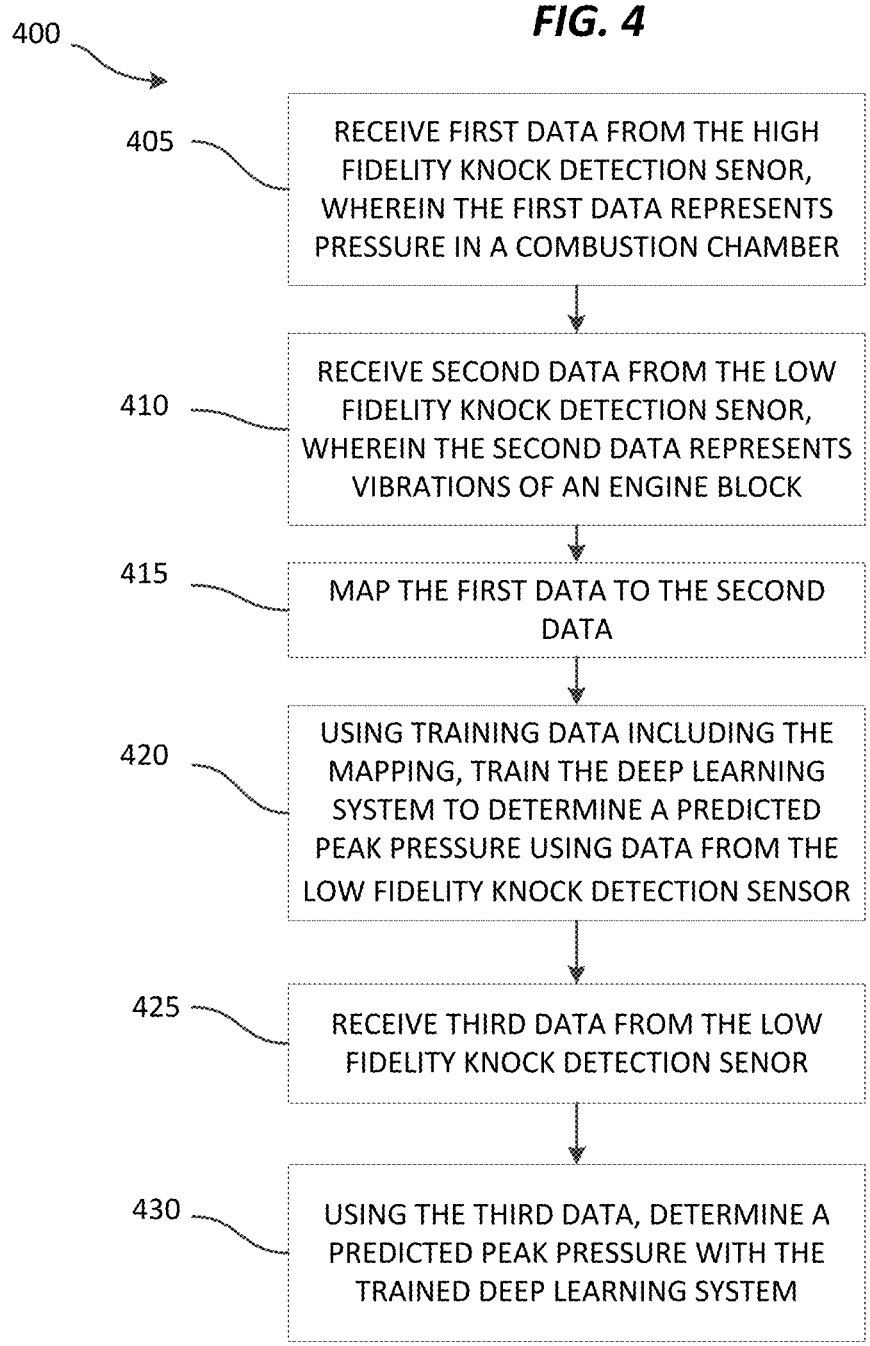
FIG. 4 is a flowchart of a method for using the system of FIG. 1 for training a deep learning system to detect engine knock with accuracy associated with high fidelity sensors despite using data from a low fidelity sensor according to some embodiments.
Figure 5:
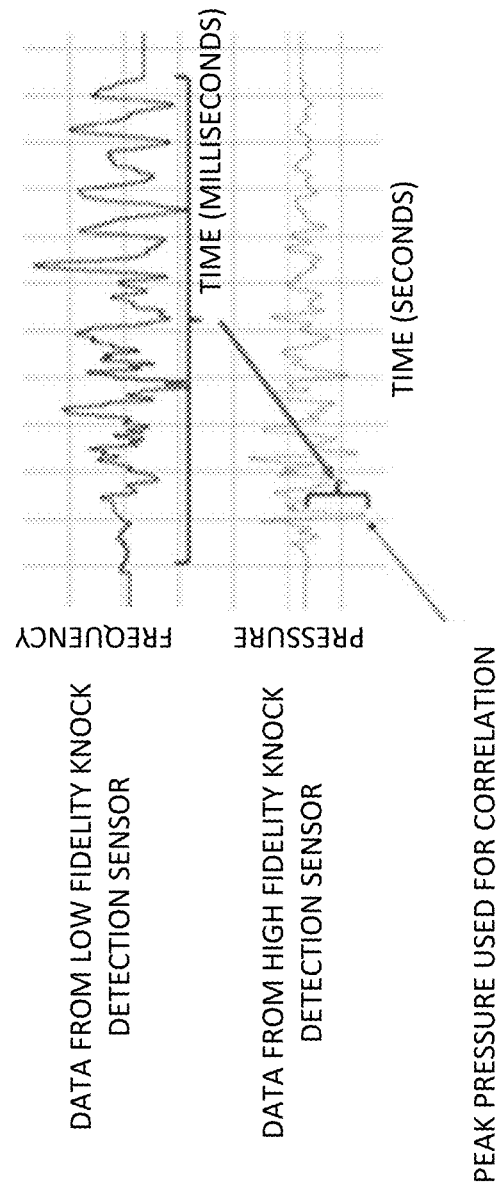
FIG. 5 is an illustration of mapping data from a high fidelity knock detection sensor to data from a low fidelity knock detection sensor.

FIG. 4 illustrates an example of a method 400 for training a deep learning system to detect engine knock with accuracy associated with high fidelity knock detection sensors despite using data from a low fidelity knock detection sensor. The method 400 begins at step 405, when the electronic processor 300 receives, from the high fidelity knock detection sensor 215 first data represents pressure of gases in the combustion chamber 230 of the engine 210. At step 410, the electronic processor 300 also receives second data from the low fidelity knock detection sensor 220, the second data is represents vibrations of the engine block 228. At step 415, the electronic processor 300 executes the sensor data mapping software 315 and maps the first data to the second data. FIG. 5 illustrates an example of the first data being mapped to the second data. As illustrated in FIG. 5, the electronic processor 300 maps a peak pressure in the first data to vibrations in the second data. The second data mapped to the peak pressure and the peak pressure (the mapped data) are included in the training data 320 in the memory 305. It should be noted that the electronic processor 300 may perform steps 405-415 of the method 400 numerous times to create a plurality of training examples for inclusion in the training data 320. At step 420, the electronic processor 300 uses the training data 320 to train the deep learning system 325 to predict a peak pressure in the combustion chamber 230 using data from the low fidelity knock detection sensor 220. At step 425, the electronic processor 300 receives third data from the low fidelity knock detection sensor 220. The third data has not been previously received by the electronic processor 300. At step 430, the electronic processor 300 executes the deep learning system 325 (the trained deep learning system) to determine a predicted peak pressure using the third data as input. It should be noted that the trained deep learning system may be moved or copied from the memory 305 to a memory included in a system other than the system 200. The other system includes, for example, a low fidelity knock detection sensor but does not include a high fidelity knock detection sensor. The trained deep learning system may be used by the other system to determine predicted peak pressures using data from the low fidelity knock detection sensor included in the other system.

Figure 6:
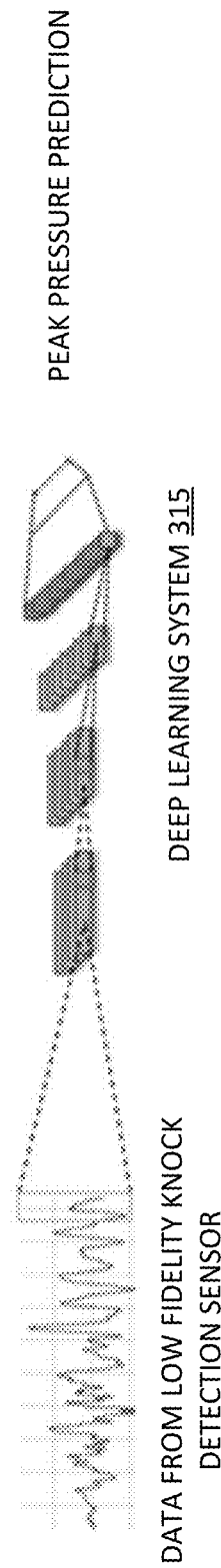
FIG. 6 is an illustration of a deep learning system included in a memory of the electronic controller of FIG. 3.

FIG. 6 illustrates an example of the deep learning system 325. In the example illustrated, the deep learning system 325 is a convolutional neural network (CNN) that accepts data from the low fidelity knock detection sensor 220 and outputs a predicted peak pressure. In one example, the convolutional neural network includes a plurality of layers. Each layer included in the convolutional neural network is fully connected allowing features extracted by the convolutional neural network to be separated into a plurality of feature spaces. In one embodiment, there are three types of layers included in the convolutional neural network. The three types of layers are convolutional layers, pooling layers, and a linear activation function layer. In one embodiment, the convolutional neural network includes a plurality of convolutional layers, each of which is followed by a pooling layer.

Figure 7B:
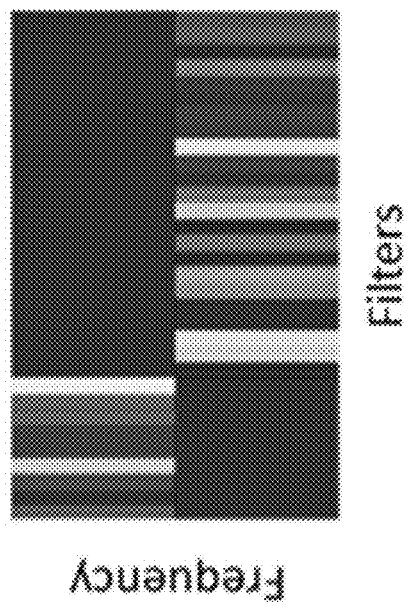
FIG. 7B is an illustration of an example of the one-dimensional filters of the last convolutional layer of a deep learning system included in a memory of the electronic controller of FIG. 3 according to some embodiments.
Figure 7A:
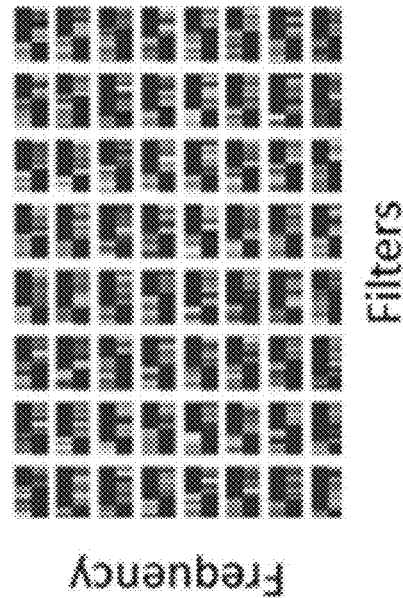
FIG. 7A is an illustration of a one-dimensional filter of a first convolutional layer of a deep learning system included in a memory of the electronic controller of FIG. 3 according to some embodiments.

Each convolutional layer includes one or more one dimensional filters. The filters are learned by the convolutional neural network. The filters extract features from the data received from the low fidelity knock detection sensor 220. For example, the filters are designed to extract features associated with the time of the vibration data. FIG. 7A illustrates an example of the one-dimensional filter of the first convolutional layer of the convolutional neural network and FIG. 7B illustrates an example of the one-dimensional filters of the last convolutional layer of the convolutional neural network. It should be noted that while the filters are learned in the time domain, FIGS. 7A and 7B illustrate frequency domain representations (created by applying a Fast Fourier transform) of the filters for ease of understanding.

Each pooling layer included in the convolutional neural network is a max-pooling layer. The pooling layers of the convolutional neural network reduce feature invariance. For example, because of the inclusion of max pooling layers in the convolutional neural network, the data from the low fidelity knock detection sensor 220 does not have to be time aligned for the convolutional neural network to determine a predicted peak pressure from the data from the low fidelity knock detection sensor 220. In other words, the peak pressure can occur at a point in time in the data from the low fidelity knock detection sensor 220 that is different from when peak pressures have occurred in the data previously received from the low fidelity knock detection sensor 220. Despite the peak pressures occurring at different times, the convolutional neural network is able to accurately identify the peak pressure.

Figure 8:
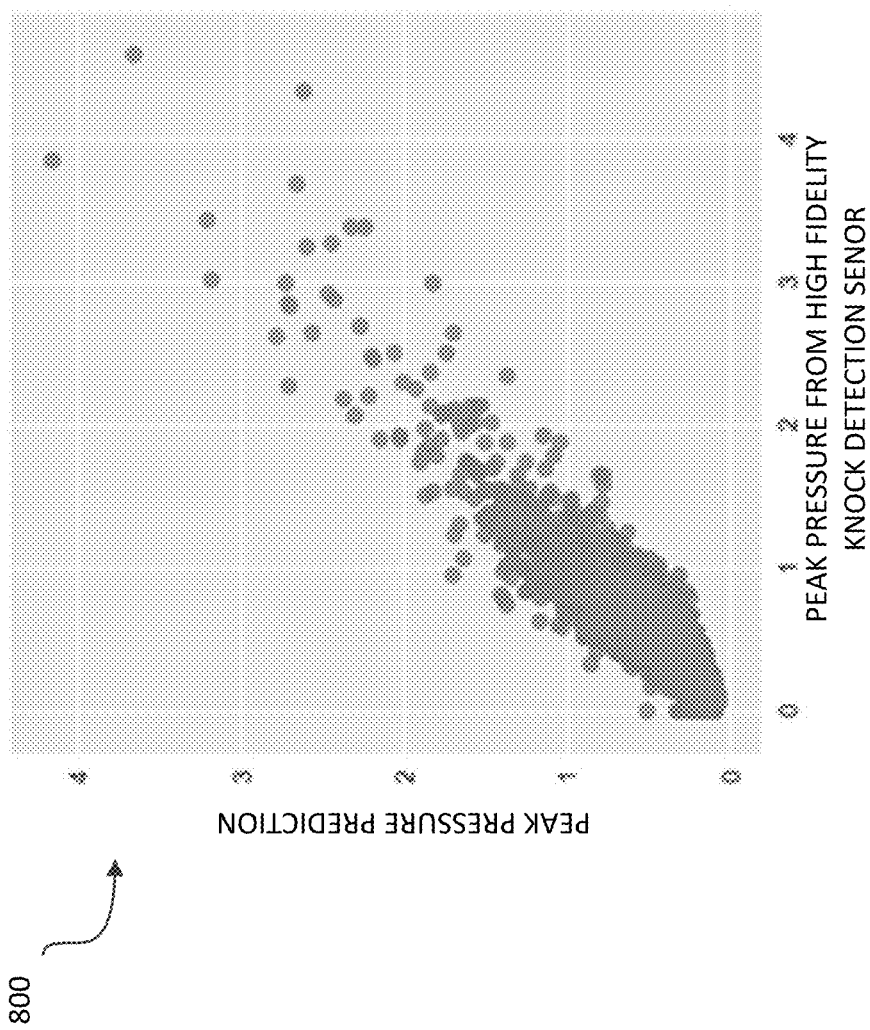
FIG. 8 is an illustration of a linear regression between a peak pressure determined by a high fidelity knock detection sensor and a predicted peak pressure determined by a deep learning system included in a memory of the electronic controller of FIG. 3 using data from a low fidelity sensor.

The final layer of the convolutional neural network (the linear activation function layer) implements a single linear activation function. The linear activation function acts as a regression function that determines a linear relationship between the distinct feature spaces and the predicted peak value of the high fidelity sensor. Based on the linear relationship, the convolutional neural network outputs a predicted peak pressure. FIG. 8 illustrates an example of a linear regression 800 between the peak pressure determined by the high fidelity knock detection sensor 215 and the predicted peak pressure determined by the convolutional neural network using data from a low fidelity sensor. As can be seen in the linear regression 800, the predicted peak pressure is closely correlated with the peak pressure determined by the high fidelity sensor.

In some embodiments, once the electronic processor 300 has determined the predicted peak pressure, the electronic processor 300 compares the predicted peak pressure to a predetermined threshold. If, for example, the predicted peak pressure is below the predetermined threshold, the electronic processor 300 detects engine knock. In some embodiments, the electronic processor 300 also predicts engine knock when the predicted peak pressure is equal to the predetermined threshold. In some embodiments, the electronic processor 300 performs a preventative measure in response to detecting engine knock. For example, the electronic processor 300 may send a signal to the ignition 225 to change the operating point of the ignition 225, thereby delaying the ignition 225. In some embodiments, the electronic processor 300 dynamically updates the operating point of the ignition 225 based on the predicted peak pressure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

The invention claimed is:

1. A system for training a convolutional neural network (CNN) to detect engine knock with accuracy associated with high fidelity knock detection sensors despite using data from a low fidelity knock detection sensor, the system comprising:
an engine;
a high fidelity knock detection sensor having a first fidelity;
a low fidelity knock detection sensor having a second fidelity, the second fidelity being lower than the first fidelity; and
an electronic processor, the electronic processor configured to:
receive first data from the high fidelity knock detection sensor, wherein the first data is measured pressure in a combustion chamber of the engine;
receive second data from the low fidelity knock detection sensor, wherein the second data is measured vibrations of an engine block;
map the first data to the second data, wherein the mapping is based at least in part on a temporal correlation of a peak pressure of the first data with the second data, and wherein the peak pressure indicates a corresponding engine knock;
using training data including the mapped data, train the CNN to determine a predicted peak pressure using data from the low fidelity knock detection sensor, wherein the CNN comprises:
one or more convolution layers having one or more one-dimensional filters which extracts features from the second data;
one or more pooling layers that reduces invariance in the extracted features; and
a linear activation layer implementing a linear regression function that determines a linear relationship between the extracted features of the second data and the measured pressure in the first data and determines the predicted peak pressure based on the linear relationship;
after training the CNN, receive third data from the low fidelity knock detection sensor, wherein the third data is a signal of the low fidelity knock detection sensor that corresponds to measurements of vibrations of the engine in a time domain;
using the third data, determine the predicted peak pressure with the trained CNN; and
detect engine knock when the predicted peak pressure is less than or equal to a predetermined threshold, wherein the predetermined threshold is based at least in part on the linear regression function.

2. The system according to claim 1, wherein one-dimensional filters learned by the convolutional neural network extract features associated with a time of the vibrations included in the second data.

3. The system according to claim 1, wherein the layers of the convolutional neural network are fully connected.

4. The system according to claim 1, wherein the system further comprises an ignition and the electronic processor is further configured to:
delay the ignition when engine knock is detected.

5. The system according to claim 1, wherein the electronic processor is configured to map the first data to the second data by:
mapping the peak pressure included in the first data to the vibrations included in the second data.

6. The system according to claim 1, wherein the system further includes an ignition and the electronic processor is further configured to:
update an operating point of the ignition based on the predicted peak pressure.

7. A method for training a convolutional neural network (CNN) to detect engine knock with accuracy associated with high fidelity knock detection sensors despite using data from a low fidelity knock detection sensor, the method comprising:
receiving, with an electronic processor, first data from a high fidelity knock detection sensor, the high fidelity knock detection sensor having a first fidelity, wherein the first data is measured pressure in a combustion chamber of an engine;
receiving, with the electronic processor, second data from a low fidelity knock detection sensor, the low fidelity knock detection sensor having a second fidelity, the second fidelity being lower than the first fidelity, wherein the second data is measured vibrations of an engine block;
mapping, with the electronic processor, the first data to the second data, wherein the mapping is based at least in part on a temporal correlation of a peak pressure of the first data with the second data, and wherein the peak pressure indicates a corresponding engine knock;
using training data including the mapped data, training the CNN to determine a predicted peak pressure using data from the low fidelity knock detection sensor, wherein the CNN comprises:
one or more convolution layers having one or more one-dimensional filters which extracts features from the second data;
one or more pooling layers that reduces invariance in the extracted features; and
a linear activation layer implementing a linear regression function that determines a linear relationship between the extracted features of the second data and the measured pressure in the first data and determines the predicted peak pressure based on the linear relationship;
after training the CNN, receiving third data from the low fidelity knock detection sensor, wherein the third data is a signal of the low fidelity knock detection sensor that corresponds to measurements of vibrations of the engine in a time domain;
using the third data, determining the predicted peak pressure with the trained CNN; and
detecting, with the electronic processor, engine knock when the predicted peak pressure is less than or equal to a predetermined threshold, wherein the predetermined threshold is based at least in part on the linear regression function.

8. The method according to claim 7, wherein one-dimensional filters learned by the convolutional neural network extract features associated with a time of the vibrations included in the second data.

9. The method according to claim 7, wherein the layers of the convolutional neural network are fully connected.

10. The method according to claim 7, the method further comprising:
delaying an ignition of the engine when engine knock is detected.

11. The method according to claim 7, wherein mapping the first data to the second data includes:
mapping the peak pressure included in the first data to the vibrations included in the second data.

12. The method according to claim 7, the method further comprising:

updating an operating point of an ignition of the engine based on the predicted peak pressure.

* * * * *